US011001029B2

(12) United States Patent
Alter et al.

(10) Patent No.: US 11,001,029 B2
(45) Date of Patent: May 11, 2021

(54) HONEYCOMB, IN PARTICULAR DEFORMABLE HONEYCOMB, FOR LIGHTWEIGHT COMPONENTS, CORRESPONDING PRODUCTION METHOD, AND SANDWICH COMPONENT

(71) Applicant: Euro-Composites S.A., Echternach (LU)

(72) Inventors: Rolf-Mathias Alter, Echternach (LU); Willy Wintgens, Troisvierges (LU); Michael Willert, Welschbillig-Ittel (DE); Ralf Schmitt, Bollendorf (DE)

(73) Assignee: EURO-COMPOSITES S.A., Echternach (LU)

( * ) Notice: Subject to any disclaimer, the term of this patent is extended or adjusted under 35 U.S.C. 154(b) by 381 days.

(21) Appl. No.: 15/511,780

(22) PCT Filed: Sep. 17, 2015

(86) PCT No.: PCT/EP2015/071381
§ 371 (c)(1),
(2) Date: Mar. 16, 2017

(87) PCT Pub. No.: WO2016/042107
PCT Pub. Date: Mar. 24, 2016

(65) Prior Publication Data
US 2017/0259520 A1    Sep. 14, 2017

(30) Foreign Application Priority Data
Sep. 17, 2014   (LU) .......................................... 92548

(51) Int. Cl.
*B32B 3/12*     (2006.01)
*B21D 47/00*    (2006.01)
(Continued)

(52) U.S. Cl.
CPC ................ *B32B 3/12* (2013.01); *B21D 47/00* (2013.01); *B29D 99/0089* (2013.01);
(Continued)

(58) Field of Classification Search
None
See application file for complete search history.

(56) References Cited

U.S. PATENT DOCUMENTS 2,608,502 A    8/1952  Karker et al.
2,704,587 A *  3/1955  Pajak ..................... E04C 2/365
                                                    428/118

(Continued)

FOREIGN PATENT DOCUMENTS

DE         8624880 U1    8/1987
DE    202012005289 U1    9/2013
(Continued)

OTHER PUBLICATIONS

Int'l Search Report dated Nov. 11, 2015 in Int'l Application No. PCT/EP2015/071381.

(Continued)

*Primary Examiner* — David Sample
*Assistant Examiner* — Elizabeth Collister
(74) *Attorney, Agent, or Firm* — Panitch Schwarze Belisario & Nadel LLP

(57) ABSTRACT

A honeycomb for curved surface lightweight components includes a plurality of elongate ribbons and connecting regions. The connecting regions are provided, respectively, between opposing ribbons to connect the ribbons together in a portion-wise manner in a firmly bonded relationship in a transverse direction. The connecting regions are arranged at regular spacings along the longitudinal direction of a ribbon. Honeycomb-like cells form cavities between the ribbons. With respect to three successive ribbons, a displacement of (Continued)

the connecting regions between first and second ribbons relative to the connecting regions between second and third ribbons toward a first side of the longitudinal direction is lesser than toward a second side of the longitudinal direction. Consequently, at least a part of the cells in cross-section in the longitudinal direction/transverse direction plane have at least one longer limb corresponding to the greater displacement and at least one shorter limb corresponding to the lesser displacement.

21 Claims, 8 Drawing Sheets

(51) Int. Cl.
    *B31D 3/00*     (2017.01)
    *E04C 2/36*     (2006.01)
    *B32B 37/14*     (2006.01)
    *B29D 99/00*     (2010.01)

(52) U.S. Cl.
    CPC ............ *B31D 3/007* (2013.01); *B32B 37/146* (2013.01); *E04C 2/365* (2013.01)

(56) References Cited

U.S. PATENT DOCUMENTS

| | | | |
|---|---|---|---|
| 2,973,294 | A | 2/1961 | McClelland, Jr. |
| 3,227,600 | A | 1/1966 | Holland |
| 3,340,023 | A | 9/1967 | Hulsey |
| 3,342,666 | A | 9/1967 | Hull |
| 4,118,263 | A | 10/1978 | Cook, Jr. |
| 4,585,381 | A * | 4/1986 | Boyse ................ B29D 99/0089 410/154 |
| 6,003,283 | A * | 12/1999 | Hull ........................ E04C 2/365 52/783.15 |
| 2008/0044621 | A1* | 2/2008 | Strauss ................ F28F 13/003 428/108 |
| 2008/0145597 | A1 | 6/2008 | Hendren et al. |
| 2010/0028649 | A1* | 2/2010 | Trouilhet ................ B32B 3/266 428/309.9 |

FOREIGN PATENT DOCUMENTS

| | | |
|---|---|---|
| EP | 0467286 A1 | 1/1992 |
| EP | 0579000 A1 | 1/1994 |
| GB | 750610 A | 6/1956 |
| LU | 86594 A1 | 4/1988 |
| WO | 9417993 A1 | 8/1994 |

OTHER PUBLICATIONS

Notice of Opposition to EP 3 194 681, including appendices A1-A3, dated Apr. 16, 2019.
Int'l Preliminary Report on Patentability dated Apr. 6, 2017 in Int'l Application No. PCT/EP2015/071381.
Bitzer, "Honeycomb Technology: Materials, Design, Manufacturing, Applicaitons and Testing," Edition 1, pp. 1-24 (1997).
Lee, Stuart M., Handbook of Composite Reinforcements, VCH Publishers Inc., ISBN 0-471-18861-1, 6 pages (1993).
Supplemental Written Submission to Opposition of EP 3 194 681, including appendices, dated Oct. 23, 2020.

* cited by examiner

W (A)

(B)

(C)

(D)

(E)

(F)

HONEYCOMB, IN PARTICULAR DEFORMABLE HONEYCOMB, FOR LIGHTWEIGHT COMPONENTS, CORRESPONDING PRODUCTION METHOD, AND SANDWICH COMPONENT

Honeycomb, in particular deformable honeycomb, for lightweight components, corresponding production method and sandwich component

CROSS-REFERENCE TO RELATED APPLICATION

This application is a Section 371 of International Application No. PCT/EP2015/071381, filed Sep. 17, 2015, which was published in the German language on Mar. 24, 2016, under International Publication No. WO 2016/042107 A1, the disclosure of which is incorporated herein by reference.

TECHNICAL FIELD

The present invention generally concerns honeycomb structures. The invention concerns in particular a honeycomb for lightweight components or constructions of lightweight structure, in particular a deformable honeycomb for lightweight components with a curved surface. The invention also concerns a honeycomb block and a production process for such a honeycomb as well as a sandwich component having such a honeycomb.

STATE OF THE ART

The use of honeycomb is very wide-spread in lightweight technology. Honeycomb, in particular as a core material of a composite component, affords particular advantages in almost all applications which require a high load-bearing capability while being of particularly low weight. Typically honeycomb is used in sandwich components as a core material between two face sheets, as shown for example in utility model DE 8624880 U1 or LU patent 86594 A1 or in EP 0 579 000 B1.

FIGS. 8(A)-(F) provide an overview of the geometries known from the state of the art of honeycomb structures which can be used as core material. Those drawings are taken from the textbook "Honeycomb technology: Materials, Design, Manufacturing, Applications and Testing", Tom Bitzer, Springer Science & Business Media, 1997 (ISBN 0412540509).

Honeycomb structures are particularly wide-spread, in which the honeycomb cells are of a regular hexagonal cross-section (see FIG. 8(A)). Processes for the production of honeycomb with a hexagonal cross-section are described for example in patent application EP 0 467 286 A1 or U.S. Pat. No. 4,118,263 A, each of these involving an expansion process.

When used as a core material in sandwich components honeycombs achieve a high level of robustness and stiffness while being of particularly low weight. Sandwich panels with hexagonal honeycombs as core material are very frequently used for example in aeronautical engineering, for example for the internal fitments of an aircraft, but also as structural components in many other areas.

In many situations of use there is also the endeavor to provide sandwich components which enjoy the advantages of conventional honeycomb structures and which at the same time allow the production of non-flat, convexly curved spatial shapes. For that purpose it is desirable for the honeycomb in itself to be designed to be sufficiently flexible, that is to say spatially deformable. It is particularly desirable for the honeycomb to be capable of deformation about a plurality of curvature axes, that is to say along complex compounds curves. In that respect there is frequently the further requirement that the honeycomb or cell walls, in spite of deformation, should meet the face sheets of the composite at an angle which is as perpendicular as possible when the honeycomb is used as the core of a sandwich component.

In the present case the expression deformable honeycomb is used to denote a honeycomb which, in comparison with conventional honeycomb geometries, for example in accordance with the state of the art shown in FIGS. 8(A)-(B) and FIGS. 8(D)-(E), has a perceptibly slighter anticlastic effect, at least upon deformation about an axis. The term anticlastic effect is used in honeycomb technology to denote the generally unwanted tendency for opposite curvature about an axis transversely relative to the desired axis of curvature (tendency to saddle formation upon curvature about an axis).

It is already known that overexpanded hexagonal honeycomb permits curvature limitedly about one axis. More complex geometries with multiple curvature however are not in practice permitted by such overexpanded honeycombs, see FIG. 1(C), and accordingly are only limitedly deformable in the present sense.

Approaches for producing deformable honeycomb are known for example from U.S. Pat. Nos. 3,227,600 A and 3,342,666 A. Such honeycombs can be shaped to form complex structures with curvatures about a plurality of axes, for example in spherical or basket-shaped surfaces. In contrast to typical honeycombs with a regular hexagon as the cell cross-section honeycombs in accordance with the above-mentioned patents do not have any anticlastic characteristic or only a slight anticlastic characteristic, that is to say they are readily deformable in space. In accordance with the two patents mentioned above that is achieved in that the individual strips from which the honeycomb is composed, before being assembled, are shaped in a wave-like configuration by a rolling-profiling, stamping-profiling or press-profiling process, that is to say they are firstly subjected to a so-called embossing process and are only thereafter joined to form a complex geometry. Thus for example a honeycomb in accordance with U.S. Pat. No. 3,227,600 A has a complex cell cross-section which is approximately of a maple leaf-shaped configuration and forms a decagon with ten limbs (edges). The geometry involved with the solution in accordance with U.S. Pat. No. 3,342,666 A is even more complex and complicated and expensive in production.

A further approach for the production deformable honeycomb is known from GB 750 610 A. This also involves an embossing process in which the metal strips or ribbons to be joined are corrugated by embossing before they are glued together. The regularly corrugated strips, strictly speaking the straight regions to be joined, are in this case not placed one upon the other over the full area or in flush relationship—as is usual for hexagonal honeycomb—but are respectively regularly displaced by about half. Therefore only about half the available surface area is used as the adhesive surface. The displacement thus results in a cell geometry which differs greatly from the regular hexagon and which is intended to achieve good deformability with a low anticlastic effect. That approach is simpler than the two mentioned above, but it does not permit production using the expansion process. In addition the reduced adhesive area involves a weaker join (in particular in the W-direction), in particular in the case of large cells.

The desired deformability with those solutions is achieved in that a length of deformable material is disposed between the firmly bonded joining locations of individual pre-profiled ribbons of the honeycomb. A disadvantage however is in particular the relatively complicated and expensive production processes on the one hand and on the other hand the joining density which is relatively slight in relation to the length of the individual ribbons, something which adversely affects compression, shearing and transverse strength. A disadvantage with the production process is in particular that the individual webs or ribbons have to be deformed by an embossing process and a pure expansion process is not possible.

A further known solution is constituted by the deformable honeycombs which are marketed by HEXCEL Corp under the trade names FLEX-CORE® and DOUBLE-FLEX®. Honeycomb of the FLEX-CORE® type is diagrammatically shown in FIG. 8(F). In this honeycomb too the cell cross-section is approximately in the form of a maple leaf. The production process is highly complicated and expensive, similarly to U.S. Pat. No. 3,342,666 A or U.S. Pat. No. 3,227,600 A. Honeycomb of the DOUBLE-FLEX® type is of a structure similar to the honeycomb structures previously known from U.S. Pat. No. 3,340,023 A.

The last-mentioned honeycomb types are of a structure of the general kind as set forth in the classifying portion of claim 1 and form the basic starting point of the present invention.

A further deformable honeycomb structure is previously known from WO 94/17993. In this case, a structure which is particularly synclastic, that is to say well deformable in space, is achieved by a complex step structure within the honeycomb cell walls. The production process required for that however is even more complicated and expensive than those in accordance with U.S. Pat. Nos. 3,342,666 A, 3,227,600 A or U.S. Pat. No. 3,340,023 A.

OBJECT OF THE INVENTION

A first object of the present invention is accordingly to provide a honeycomb having improved properties, which can be produced comparatively easily, in particular in the pure expansion process. A further object is to propose a honeycomb which, in spite of good spatial deformability, in particular good synclastic properties, meets high strength requirements. On the other hand the invention also seeks to provide a particularly simple production process for synclastic honeycomb.

GENERAL DESCRIPTION OF THE INVENTION

A honeycomb of the general kind set forth for lightweight components in particular a deformable honeycomb for lightweight components having a curved surface includes elongate ribbons of sheet-like or film-like material having a longitudinal direction (L). The ribbons are disposed flat in opposite relationship in the transverse direction (W) transversely relative to the longitudinal direction. Provided between two oppositely disposed ribbons is a plurality of connecting regions, in particular adhesive strips, which bond the ribbons together portion-wise in the transverse direction (W) and preferably continuously in firmly bonded relationship and in the direction of the honeycomb thickness (T). The ribbons are arranged at regular spacings along the longitudinal direction of a ribbon with a periodic center spacing. The honeycomb includes honeycomb-like cells which form cavities between the ribbons.

According to the invention the desired deformability of the honeycomb is achieved in that the displacement of two successive rows of connecting regions, that is to say between the sheets or ribbons of two successive rows of cells, is perceptible or is eccentric by a predetermined amount. In this case the predetermined displacement is considered in the longitudinal direction and in relation to the periodic center spacing or the center perpendicular of the connecting regions. A corresponding geometry is to occur at least in partial regions of the honeycomb, preferably in a predominant proportion of the surface area.

According to the invention, in a honeycomb as set forth in the classifying portion of claim 1, that is achieved in particular that—in relation to three successive ribbons—a predetermined displacement of the connecting regions between first and second ribbons of the succession in relation to the connecting regions between second and third ribbons towards one side of the longitudinal direction is markedly smaller than towards the other side of the longitudinal direction.

This provides that at least a part of the cells, in the state when the honeycomb at least partially expands in the transverse direction and is not yet curved, in cross-section (considered in the main plane or the L/W plane), is of a form having at least one longer limb (that is to say a side or edge) and preferably at least one shorter limb. The longer limb of the cross-sectional shape corresponds in that respect to the greater displacement and the shorter limb to the lesser displacement. The dimension of the shorter limb in the ribbon direction can be vanishingly small or tend towards zero, but in preferred embodiments is of a predetermined minimum size.

In the case of a vanishingly small predetermined displacement towards one side the cross-sectional shape has either only four or only five limbs which can be recognized as such, but embodiments with six limbs are preferred. The resulting cross-sectional form can be in particular in the manner of an irregular polygon and/or a form which is asymmetrical relative to the T/W plane. The cross-sectional form can approximately correspond to a polygon.

In a manner corresponding to the predetermined displacement, at least at a longer limb, that is to say at least at a honeycomb wall of each cell, there is a certain length of material available, which is relatively stress-free in the L- and/or W-direction and can be controllably stretched or compressed. In that way a virtually stress-free deformation is respectively possible in that region of the honeycomb cell. That can already be achieved solely by a shift in the displacement of the alternately arranged connecting regions, that is to say without the overall periphery of the individual cell being markedly greater than in known honeycombs. The shorter limb can also contribute to deformability, but is not absolutely necessary for that purpose.

As a result the honeycomb structure according to the invention has overall good synclastic properties and a high level of stability. In addition honeycombs with the irregularity produced in accordance with the invention in the polygon shape have a surprisingly slight tendency to break, even with tight radii of curvature or tight osculating circles. In addition it is possible to ensure a substantially right-angled position of the honeycomb walls relative to adjoining face sheets.

In practice production in a pure expansion process is preferred, that is to say production without a previous embossing process. In the expansion process the honeycomb structure according to the invention can be achieved with a relatively low level of complication and expenditure, namely upon deposit of the sheet-like or film-like material prior to the pressing and the expansion steps. In that case stacking or deposit of the layers or sheets which are to be provided with connecting means, for example which have adhesive lines printed thereon, is effected in such a way that the displacement of the connecting regions of successively stacked sheets or layers is not arranged centrally, but differs geometrically from the center perpendicular by an established predetermined amount. Here center perpendicular means the perpendicular center line of the center points of adjacent connecting regions of the same sheet prior to expansion. In the case of adhesive joins a predetermined displacement of the connecting regions is thus already implemented in the stacked arrangement, which displacement is effected asymmetrically from sheet to sheet or layer to layer, that is to say there is a lesser displacement towards one side than towards the other side.

It is to be noted that the predetermined dimensioning of the displacement—independently of the state of expansion of the honeycomb—is to be interpreted as how the spacing, respectively measured along the configuration of the adjoining ribbon or the ribbon to be connected, of the projection on to that ribbon, that is to say always in the direction in which it extends, is to be considered.

The ribbon may possibly extend in non-linear fashion. Accordingly the term polygonal form is also used to denote those angular shapes in which limbs or edges do not extend in a straight line. In addition the term ribbon in the present case means quite generally any kind of a relatively long, thin and comparatively narrow strip. The term ribbon includes in particular but not exclusively strip-like portions which occur in individual honeycomb slices in the expansion process by separation or sawing of an expanded block which was formed from stacked film-like sheets. Strips which were pre-profiled in the embossing process and which are individually joined to form a honeycomb are also designated as ribbons in the present case.

Typically at any event in a finished honeycomb each ribbon is of a dimension in the longitudinal direction which is greater by a multiple, generally at least by at least one order of magnitude, than its width (in the direction of the honeycomb thickness), which in turn is typically greater by a multiple, generally at least by at least one order of magnitude, than the thickness or height of the ribbon (in the transverse direction of the honeycomb). The terms sheet or sheets in the present case signify a portion or portions comprising a material which is of thin gauge in relation to the areal dimensions, for example paper-like or film-like material which is typically cut to a predetermined format (which does or does not involve a standard size).

An embodiment provides that each eccentric displacement is respectively always markedly lesser towards the first side. In practice this embodiment affords particularly good deformability. Alternatively there can be an eccentric displacement towards the first side and the second side respectively alternately or in alternating directions. That embodiment has good strength values.

Preferably the displacement which as defined hereinbefore is eccentric is alternately intermittently repeated, that is to say the honeycomb also has connecting regions which are not displaced relative to each other and which technically are disposed at the same level in the longitudinal direction. Preferably in that case each second group of connecting regions is undisplaced, that is to say the connecting regions, in relation to any four ribbons which occur in succession in the transverse direction (W), are undisplaced respectively between the first and second ribbons and between the third and fourth ribbons. In that way it is possible in a simple fashion to achieve good deformability with good strength values.

Particularly in consideration of good deformability therefore a configuration in which displaced and undisplaced connecting regions always alternate or follow each other cyclically is desirable. In that case in any succession of four ribbons, only the connecting regions between the first and second ribbon are displaced eccentrically relative to the connecting regions between the second and third ribbons. The honeycomb however can also be formed without undisplaced connecting regions, that is to say exclusively and throughout with an eccentric displacement, in which case connecting regions which follow each other, in the transverse direction, are always eccentrically displaced relative to each other. This particularly simple configuration exhibits good deformability in practice at least about one axis.

In preferred embodiments the asymmetrical or eccentric displacement is provided regularly and sufficiently frequently that at least a predominant proportion of the honeycombs in cross-section in the L/W plane involve a form having at least one short and one long limb, that is to say in the manner of an irregular polygon.

Good deformability can be achieved if the ratio of the lesser displacement to the greater displacement ≤0.45, in particular ≤0.4. Good deformability can also be achieved if the ratio of the lesser displacement to the center spacing between the connecting regions is ≤⅖, in particular ≤⅓, wherein the connecting regions are typically periodically spaced in relation to a ribbon.

In the case of desirable honeycomb geometries the width of the connecting regions in relation to the regular center spacing between the connecting regions is at least ⅛ and at most ⅓, generally preferably at least ⅙ and at most ¼. In particular with such dimensions and with strip-like connecting regions extending in the direction of the honeycomb thickness, it is advantageous if the lesser displacement is greater than or at least equal to the width of the connecting regions. In this case the connecting regions define the shortest limb dimension of the irregular polygon. The limbs corresponding to the lesser displacement however can also be of a smaller dimension than the connecting regions.

Practical tests have shown that a suitable minimum length of the shorter limb corresponding to the smaller displacement in the irregular polygon cross-section of the honeycomb cells is achieved if the lesser displacement is greater by at least a factor of 1.5 than the width of the connecting regions. As good deformability is achieved in particular by the comparatively longer limb in the irregular polygon cross-section it is advantageous in the above-mentioned arrangement if the ratio of the greater displacement to the width of the connecting regions is so selected that said ratio is ≥2 and ≤4. Preferably the last-mentioned ratio should be between ≥2.25 and ≤3.75.

A geometry has also proven to be particularly desirable in which the cross-section in the irregular polygon shape has overall at least five, preferably precisely six limbs (or edges), that is to say six corners, but is substantially cup-shaped, for example approximately champagne glass-shaped. Accordingly it is advantageous if the irregular polygon cross-section respectively has two longer limbs corresponding to the greater displacement and two shorter limbs corresponding to the lesser displacement. The other two limbs of the hexagon then respectively correspond to the width of the adjoining connecting regions or the adhesive strips. The width of the connecting regions can approximately correspond to the dimension of the shorter limb, which simplifies the geometrical relationships.

Particularly in the last-mentioned embodiment it is advantageous if the spacing measured in the transverse direction between two approximately parallel rows of mutually successive connecting regions is at least slightly less than the dimension of the lesser displacement in the longitudinal direction. That can be achieved by suitable expansion in which overexpansion is to be avoided.

Geometries in which the longer limb extends in perceptively curved configuration, in particular in a tangent-like or S-curve configuration have proven to be particularly well deformable.

An embodiment which is not necessarily required for deformability but which promotes that aspect and also a level of isotropy which is as high as possible, is one in which the unequal displacement according to the invention is regularly repeated in the honeycomb, preferably in the longitudinal direction and in the transverse direction. A particularly preferred embodiment is one in which the connecting regions, in relation to ribbons following each other in the transverse direction, are respectively disposed at the same level as viewed in the longitudinal direction, between the first and second ribbon and between the third and fourth ribbon respectively. In other words the asymmetrical displacement is preferably arranged intermittently alternately in such a way that in the transverse direction or in the direction of the stack height, the connecting regions are disposed at the same level in the longitudinal direction, in superposed relationship with each respective second sheet or layer.

Particularly in the case of the last-mentioned embodiment simple production is made possible by virtue of the fact that there is a single displacement towards the same side of the longitudinal direction respectively. In principle however a double displacement (that is to say a displacement which alternates towards the one side and the other side) can be provided. The displacement can differ in terms of magnitude and succession, but is preferably repeated cyclically. In the case of a single displacement however this provides that predominantly all honeycombs in cross-section in the main plane involve a shape in the manner of an irregular polygon, in particular a cup-shaped cross-section.

The proposed honeycomb configuration and the process for the production thereof are suitable not exclusively but in particular for the use of ribbons of paper-like fiber material or ribbons of metal film. The fiber material used can be in particular a glass fiber or aramid fiber-based paper, fabric or film material which is possibly pre-impregnated with resin and/or subsequently impregnated and which can be finished by hardening to give a fiber composite plastic (FCP). Alternatively to or in combination with FCP it is also possible to use film-like materials comprising a technical thermoplastic material and/or thermosetting material. As the metal film for providing the ribbons, in particular aluminum film is considered because of the good ratio of weight to strength. High-quality steel or copper film can also be used in honeycombs according to the invention when particular demands are involved, for example in regard to chemical resistance or conductivity.

It is also in accordance with the invention to use multilayer homogeneous or non-homogeneous film material, for example laminates of various metal and/or plastic films. In that case the connecting regions can be produced by adhesive, welding, soldering and the like.

In order not to adversely affect deformability, it is desirable in particular in the case of fiber composite honeycombs for the geometrical relationships to be so selected that the honeycomb thickness is of smaller magnitude than six times, preferably less than four times, the dimension of the longer limb in the longitudinal direction. It is however also possible to implement greater honeycomb thicknesses, depending on the material and the production process, for example with ribbons of material suitable for thermal deformation. The desired shaping operation can be implemented under the action of heat, in particular when greater honeycomb thicknesses are involved.

In accordance with geometrical deformability it is also advantageous if the lesser displacement is of greater magnitude by a multiple, in particular by at least ten times, than the thickest material thickness used for the ribbons of the honeycomb.

The invention also concerns a sandwich component as set forth in claim 15, that is to say with at least one face sheet and a honeycomb according to one of the above-described embodiments as the core of the sandwich. After deformation of the honeycomb hardening can be effected together with the face sheet so that a stable sandwich component with a complexly curved spatial shape or curved surfaces can be produced. Naturally the honeycomb according to the invention can also be used for the production of components which are region-wise or completely flat or uncurved.

The invention further concerns a honeycomb block as set forth in claim 20 as an intermediate product for the production of a honeycomb according to the invention, using the expansion process. According to the invention the honeycomb block is also characterised by the predetermined eccentric displacement of the connecting regions.

Finally the invention also concerns a particularly simple production process for honeycomb, in particular deformable honeycomb, as set forth in claim 21.

The process firstly includes stack-like deposit of sheets of thin sheet-like or film-like material. In that case the sheets are stacked flat one upon the other in a transverse direction transversely relative to a longitudinal direction of the sheets. Then, in per se known manner, the sheets are connected in firmly bonded relationship in the transverse direction to give an interconnected structure ("unexpanded block"). For that purpose for example adhesive strips can be pre-hardened or finish-hardened by heat and/or pressure. Irrespective of the nature of the firmly bonded connection there are provided a plurality of connecting regions which connect the sheets portion-wise together in firmly bonded relationship in the transverse direction and which are arranged at regular spacings along the longitudinal direction of a sheet with a periodic center spacing. Typically the connecting regions are in the form of adhesive strips which are applied by printing to the sheets at one side before the stacking operation.

Subsequently, depending on the material used, the process either involves expansion of the entire block and thereafter separation of the block into individual honeycombs, or however separation into individual slices and then expansion of the individual slices to form honeycombs.

Expansion of the block is always effected at least with a main component in the transverse direction to form honeycomb-like cells with cavities between the sheets or ribbons. Separation of the block into a plurality of individual honeycombs or slices is typically effected by cutting substantially along separation planes parallel to the L/W plane.

A deformable honeycomb in accordance with the invention is produced in a particularly simple fashion by a procedure whereby, in the stacking operation, care is taken to ensure that, in relation to three successive sheets, a displacement of the connecting regions between the first and second sheets relative to the connecting regions between the second and third sheets is markedly smaller towards one side of the longitudinal direction than towards the other side thereof.

In principle such a displacement can also be achieved by a combined embossing and expansion process. However production is particularly simple if the sheets or ribbons are stacked in non-profiled form or without previous embossing, that is to say the honeycomb is produced in a pure expansion process.

In regard to the bonding connection, besides adhesive, all other kinds of bonding connection involving intimate joining of the materials involved can be considered, for example sheet-wise welding and soldering are also in accordance with the invention. The ideal nature of the bonding adhesive or welding connection is selected in dependence on the sheet material, thus for example when dealing with metal films bonding connection of the sheets can be considered by using diffusion welding, for example to achieve a monolithic honeycomb structure. When using FCP and thermosetting materials adhesive is preferred while when using thermoplastic materials adhesive and/or a welded connection is preferred.

The honeycomb according to the invention is particularly suitable for lightweight components, in particular as a deformable honeycomb for lightweight components having a surface which is curved in space.

Further situations of use are also in accordance with the invention, for example in filter devices in which a large active surface area and good deformability of the structure having that surface are desirable.

A further example of use are so-called crash absorbers, in particular three-dimensionally shaped components for absorbing kinetic or mechanical energy (referred to as "3D crash absorbers"), yielding elements, shock absorbers and the like.

BRIEF DESCRIPTION OF THE FIGURES

Further details, features and advantages of the invention will be apparent from the more detailed description hereinafter of preferred embodiments by way of example with reference to the accompanying Figures. In the Figures which are diagrammatic and not true to scale.

DESCRIPTION OF A PREFERRED EMBODIMENT

Figure 1A:
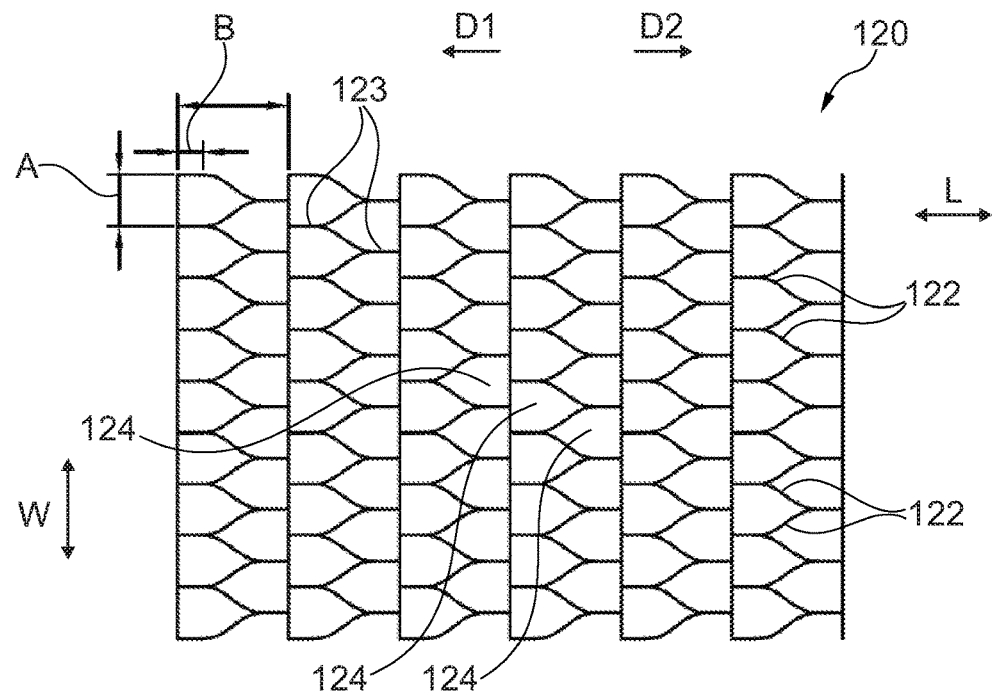
FIG. 1A shows a diagrammatic plan view of a honeycomb according to the invention of a first particularly preferred embodiment.
Figure 1B:
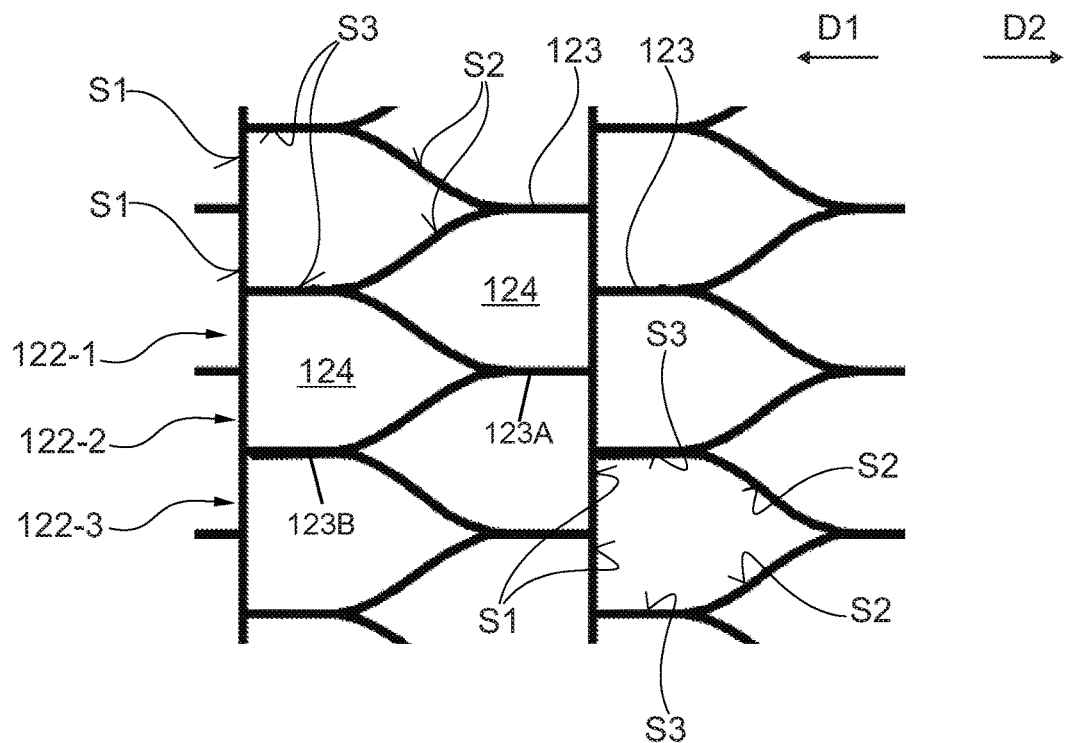
FIG. 1B shows an enlarged partial region of FIG. 1A.

FIGS. 1A-1B show a partial region of a deformable honeycomb 120 as a plan view on to the ON plane, that is to say the plane formed by the L-direction (longitudinal direction) and the W-direction (transverse direction), corresponding to the plane in FIG. 1A.

The honeycomb comprises a plurality of elongate ribbons 122 which considered roughly extend in the L-direction and are in mutually opposite relationship with the main surface extending in the L-direction and the T-direction (honeycomb thickness, that is to say perpendicularly to FIGS. 1A-1B).

In the W-direction, a respectively plurality of adhesive strips 123 provided between two mutually opposite ribbons 122 connect the ribbons 122 to form an interconnected honeycomb-like structure forming the honeycomb 120. As described in greater detail hereinafter the adhesive strips 123 which are arranged continuously in strip form in the T-direction respectively connect adjacent ribbons 122 portion-wise to each other. For that purpose the adhesive strips 123 are arranged at regular spacings in the L-direction of a ribbon 122, that is to say with a periodic center spacing I between adjacent adhesive strips 123.

Between the ribbons 122 extending sinuously or in meander fashion in the L-direction honeycomb-like cells 124 form the cavities of the honeycomb 120, that have a weight-saving action.

As can be seen from FIGS. 1A-1B, in relation to three successive ribbons, for example 122-1, 122-2, 122-3 in FIG. 1B, a displacement of the connecting regions 123A connecting the first and second ribbons 122-1 and 122-2 in relation to the connecting regions 123B connecting the second and third ribbons 122-2 and 122-3 is markedly smaller towards the one side D1 of the L-direction, than towards the other side D2. As a result, as shown in FIGS. 1A-1B, this results in the cells 124 being shaped in the manner of an irregular polygon in cross-section in the L/W plane. In the example shown here all cells 124 are of an identical basic shape in plan similar to the elevational view of a champagne glass. The honeycomb 120 is similar in the lattice or grid pattern to a fish scale pattern. In cross-section parallel to the L/W plane the cells 124 have honeycomb walls including at least one longer limb S2 corresponding to the greater displacement and at least one shorter limb S1 corresponding to the lesser displacement.

In the embodiment illustrated here the cells 124, considered in themselves, in cross-section, are technically of mirror-image symmetrical configuration relative to the L-direction and, considered from a row in relation to the next row, are arranged in mirror-reversed relationship in relation to the W-direction. This means that the honeycomb 120 is overall of a regular pattern with honeycombs 124 which are of substantially the same cup-shaped cross-section or plan configuration. In this example each cell 124 has two short limbs S1, two long limbs S2 and two further limbs S3. Provided at the limbs S3 are the adhesive strips 123 and accordingly the limbs S3 are of the length of the width B of the adhesive strips 123, that approximately corresponds to the dimension of the shorter limb S2. In one configuration, the second ribbon 122-2 includes first, second, third and fourth portions arranged successively. In one example, the limbs S3 may correspond to the first and third portions of the second ribbon 122-2, with the short limb S1 corresponding to the second or fourth portion of the second ribbon 122-2 and the long limb S2 corresponding to the other of the second or fourth portion of the second ribbon 122-2.

The long honeycomb walls or limbs S2 which are to be found with this geometry extend in a curved form in tangential relationship and by virtue of their excessive length make the crucial contribution to the deformability of the honeycomb 120. FIGS. 1A-1B show honeycomb 120 in a state of being nominally completely expanded in the W-direction, thereby affording the maximum weight saving. In this case the dimension of the cells 123 in the W-direction is precisely double the length of the shorter limb S1. Synclastic properties which are further improved are afforded if the short limbs S2 are not aligned in the W-direction, but are slightly angled with an obtuse angle, that is to say in plan view they represent an approximately rhombic irregular polygon. That can be achieved by a less pronounced expansion or enlargement A without increased expenditure and complication.

In such an embodiment which is also preferred the enlargement or dimension of the cells 123 in the W-direction is perceptibly less than double the length of the short limb S2, that is to say the spacing of successive connecting regions 123A, 123E in the W-direction is less than the dimension of the lesser displacement towards the one side D1 of the L-direction.

Figure 1C:
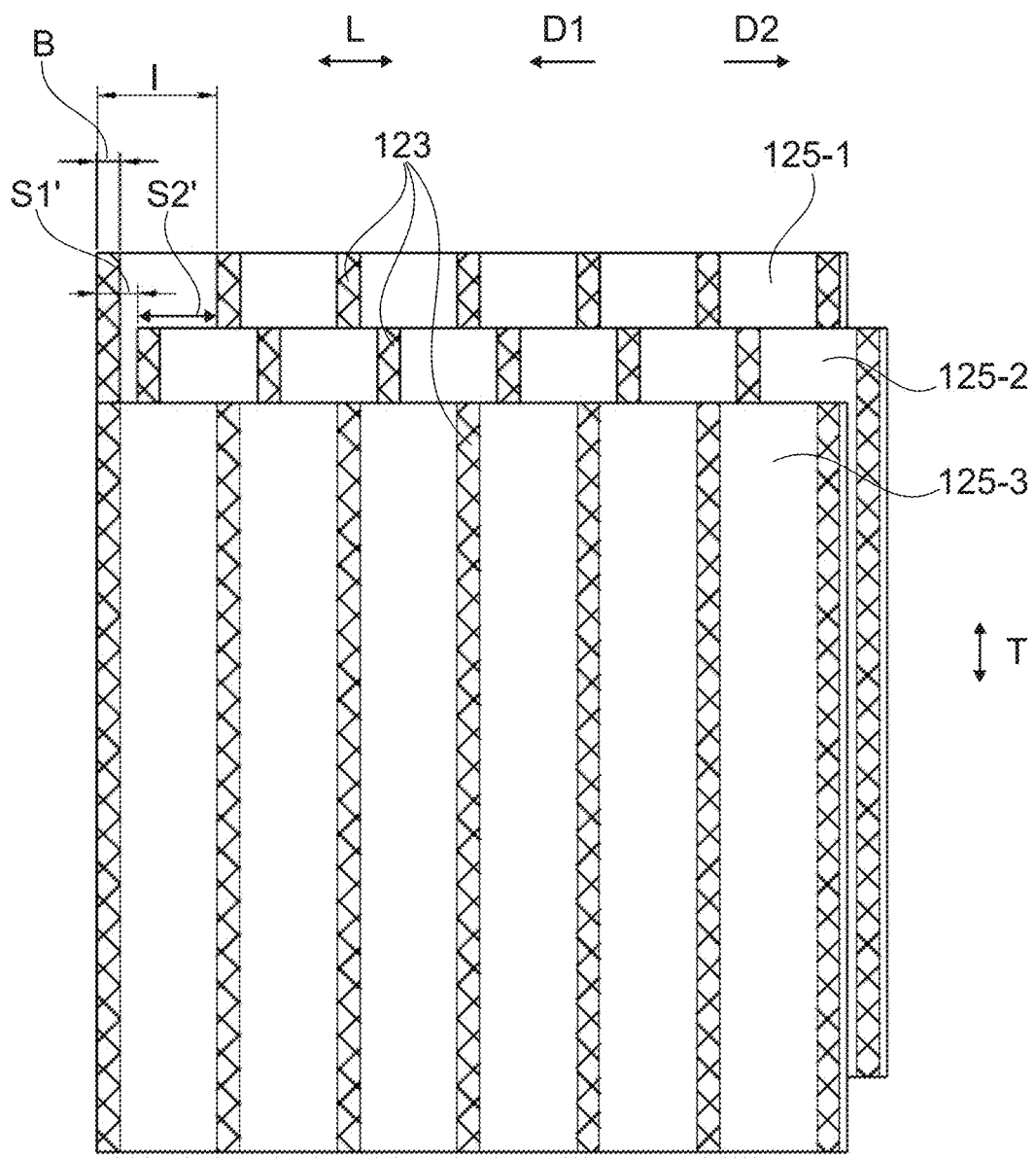
FIG. 1C shows a diagrammatically illustrated deposit procedure in the production process for the production of a honeycomb as shown in FIGS. 1A-1B.

FIG. 1C shows a diagrammatic deposit stacking procedure for the production of a honeycomb according to the invention, for example as shown in FIGS. 1A-1B. Production is effected for the major part in per se known manner using the expansion process (see FIG. 5), like for example in the case of a hexagonal honeycomb. For that purpose FIG. 1C only illustrates the initial step in the stacking of individual sheets 125 of thin sheet-like or film-like material. The adhesive strips 123 are applied by printing on one side of the sheets 125 in known manner, extending in a straight line in the T-direction at a periodic center spacing I. The sheets 125 are only shown in FIG. 1C as being displaced in the T-direction for illustration purposes.

A decisive difference in relation to the state of the art however is the displacement which is actually provided in the L-direction, namely that in the stacking procedure for the sheets 125, in relation to three successive sheets 125-1, 125-2, 125-3, a predetermined displacement of the connecting regions 123 between the first and second sheets 125-1 and 125-2 in relation to the connecting regions between the second and third sheets 125-2 and 125-3 is markedly smaller to one side D1 of the L-direction than to the other side D2. In that case the third sheet 125-3 is again deposited without displacement in precisely flush relationship with the first sheet 125-1. For illustration purposes only three sheets 125 are shown in FIG. 1C. It will be appreciated that in practice a multiplicity of some tens or hundreds of sheets will be stacked and glued.

Thus, without any other substantial change in the tried-and-tested operating procedure using the expansion principle (see FIG. 5) a honeycomb 120 is produced, of a shape similar to FIGS. 1A-1B. A double displacement (alternately in one direction and the other), only one displacement provided region-wise within the honeycomb 20, or magnitudes varying in the W-direction of the unequal eccentric displacement are also in accordance with the invention as described in greater detail hereinafter.

Without limitation and just for the sake of better illustration the honeycomb 120 as shown in FIGS. 1A-1B can involve for example the following data:

EXAMPLE 1

A: about 4.6 mm
B: 3 mm
I: 16 mm
S1': 5.33 mm
S2': 10.66 mm
Length S1: about 2.3 mm ($\approx$S1'–B)
Length S2: about 7.6 mm ($\approx$S2'–B)
T: between 5 and 25 mm
Material of the sheets/ribbons: Aramid fiber paper (to be hardened after deformation), of a thickness of 0.08 mm.

Figure 2A:
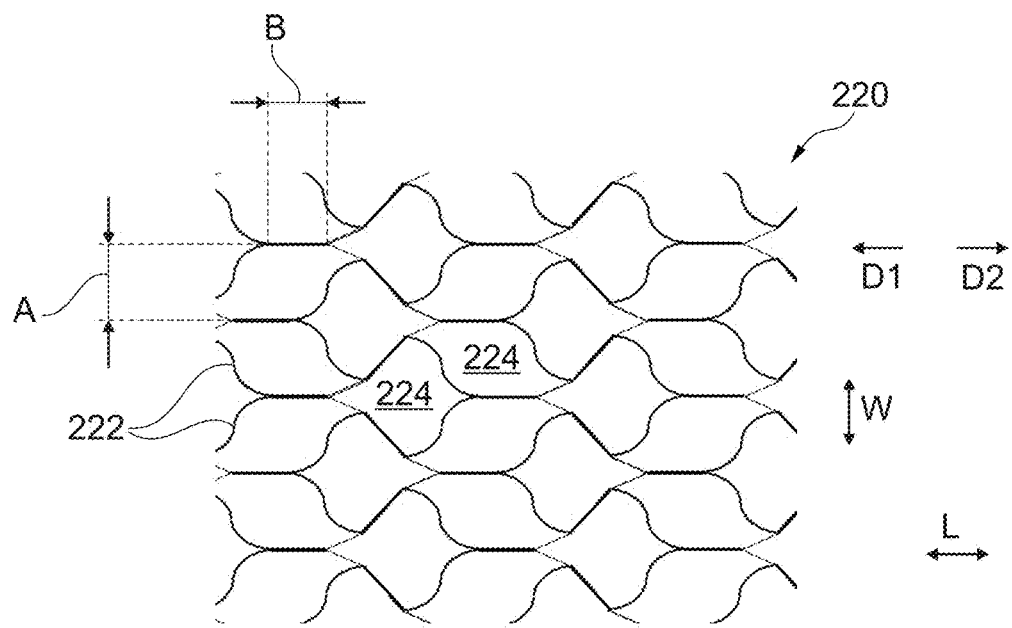
FIG. 2A shows a diagrammatic plan view of a honeycomb according to the invention of a second embodiment.
Figure 2B:
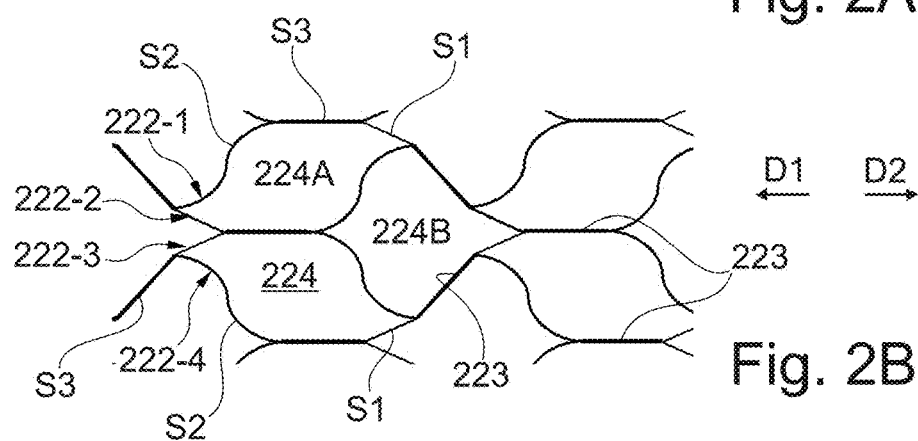
FIG. 2B shows an enlarged partial region of FIG. 2A.

FIGS. 2A-2B show in diagrammatic form a second embodiment of a deformable honeycomb 220 also in a partial region of the plan view on to the L/W plane corresponding to the plane in FIG. 2A. Corresponding or identical parts or features in comparison with FIGS. 1A-1B are denoted by corresponding references. Only relevant differences and points in common will be described in greater detail here for the avoidance of repetition.

As in FIGS. 1A-1B, here too in FIGS. 2A-2B each honeycomb cell 224 between the sinuous ribbons 222 extending roughly in the L-direction each have a respective cross-sectional shape which is asymmetric relative to the T/W plane, in the L/W plane. In FIGS. 2A-2B however the honeycomb cells 224 involve two different basic shapes 224A, 224B which are regularly repeated over the surface. The one shape 224A is repeated in the W-direction in each case in mirror-reversed relationship with the L/T plane, but the other shape 224B is mirror-reversed in relation to the T/W plane.

Figure 2C:
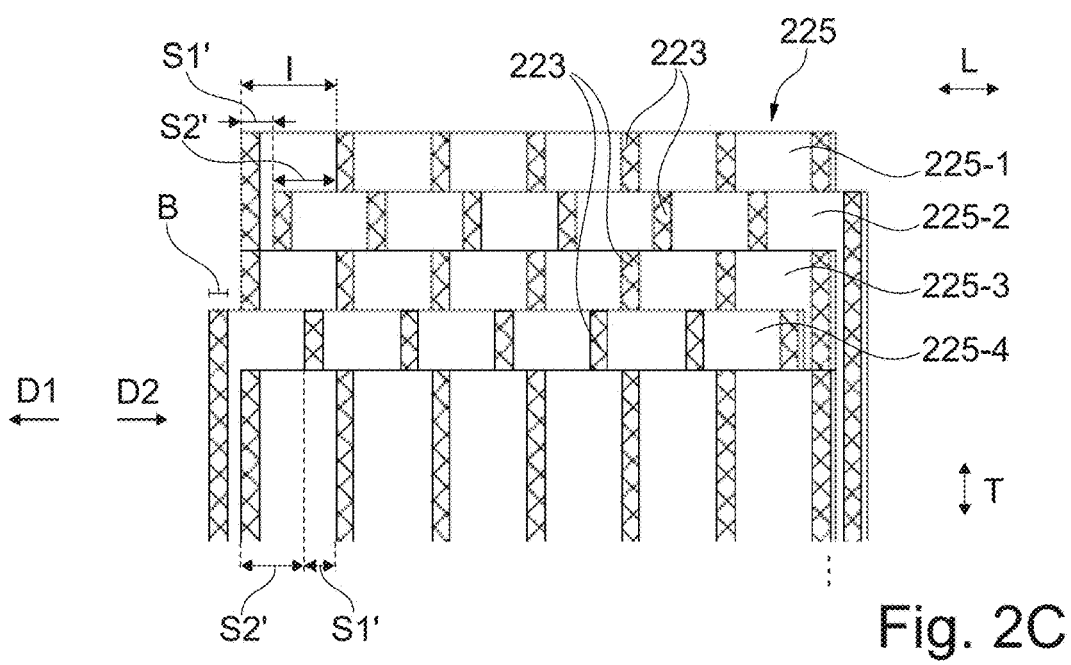
FIG. 2C shows a diagrammatically illustrated deposit stacking procedure for a honeycomb as shown in FIGS. 2A-2B.

Those shapes 224A, 224B of the honeycomb cells 224 arise out of the deposit stacking procedure shown in FIG. 2C. In this case a predetermined eccentric displacement is respectively provided alternately or alternatingly towards the first side D1 and then towards the second side D2 and vice-versa. Accordingly, in any ribbon sequence, the connecting regions or adhesive lines 223 between the first ribbon 222-1 and the second ribbon 222-2 are displaced relative to the connecting regions between the second ribbon 222-2 and the third ribbon 222-3 in the one direction D1 and D2 respectively, while the connecting regions 223 between the second ribbon 222-2 and the third ribbon 222-3 are however displaced in the opposite direction D2 and D1 respectively, relative to the connecting regions 223 between the third ribbon 222-3 and the fourth ribbon 222-4. In addition the above-defined eccentric displacement is alternately intermittently repeated, that is to say the connecting regions 223, in relation to four ribbons 222-1 . . . 222-4 which follow each other in the transverse direction (W) are respectively undisplaced between the first and second ribbons 222-1 and 222-2 and between the third and fourth ribbons 222-3 and 222-4, that is to say they lie at substantially the same level in the L-direction. Here too the connecting regions 223 form the third limb S3 which can possibly be disposed inclinedly relative to the L-direction (as shown in FIGS. 2A-2B).

By virtue of a suitable larger displacement S2' in comparison with the lesser displacement S1', this arrangement also involves longer limbs S2 as honeycomb walls, which for the sake of improved clarity are shown in FIGS. 2A-2B with a configuration which is more greatly curved in comparison with a practical embodiment. The shorter limbs S1 in this embodiment as shown in FIGS. 2A-2B can also be of a dimension in the direction in which the ribbons 222 extend of less than 40% for example about 25% of the corresponding dimension of the longer limbs S2. In this case the lesser displacement S1' is provided alternately towards the first side D1 and then the second side D2 and vice-versa.

FIG. 2C shows the stacking procedure for the embodiment shown in FIGS. 2A-2B. In this case, starting from a sheet 225-1, in the sequence of sheets 225-1 ... 225-4, the next sheet 225-2 is deposited with a slight displacement S1' in the one direction D1, the next-but-one sheet 225-3 is not displaced relative to the first sheet, and the third next sheet 225-4 is finally displaced with the same displacement S1' but in the other direction D2. That procedure gives rise to the basic forms of the honeycombs 224 shown in FIGS. 2A-2B after partial or complete expansion insofar as the ratio of the lesser displacement S1' relative to the width B of the connecting regions is perceptibly greater than 1. Preferably that ratio is in the range: $1.5 \leq S1'/B \leq 2.5$, and is preferably about 2. The dimensioning of the greater displacement S2' in the direction in which they extend corresponds to the difference between the dimension of the center spacing I and the dimension of the lesser displacement S1', hence resulting in corresponding ratios between the values B, I, S1' and S2'. In a preferred embodiment the center spacing I is an integral multiple of the width B, preferably at least 4 times.

Without limitation and only for the sake of better illustration the honeycomb 220 as shown in FIGS. 2A-2B can involve for example the following data:

EXAMPLE 2

A: 3 mm
B: 3 mm
I: 12 mm
S1': 5.33 mm
S2': 10.66 mm
Length S1: about 2.3 mm ($\approx$S1'-B)
Length S2: about 7.6 mm ($\approx$S2'-B)
Material of the sheets/ribbons: Aramid fiber paper (to be hardened after deformation), of a thickness of 0.08 mm.

Figure 3A:
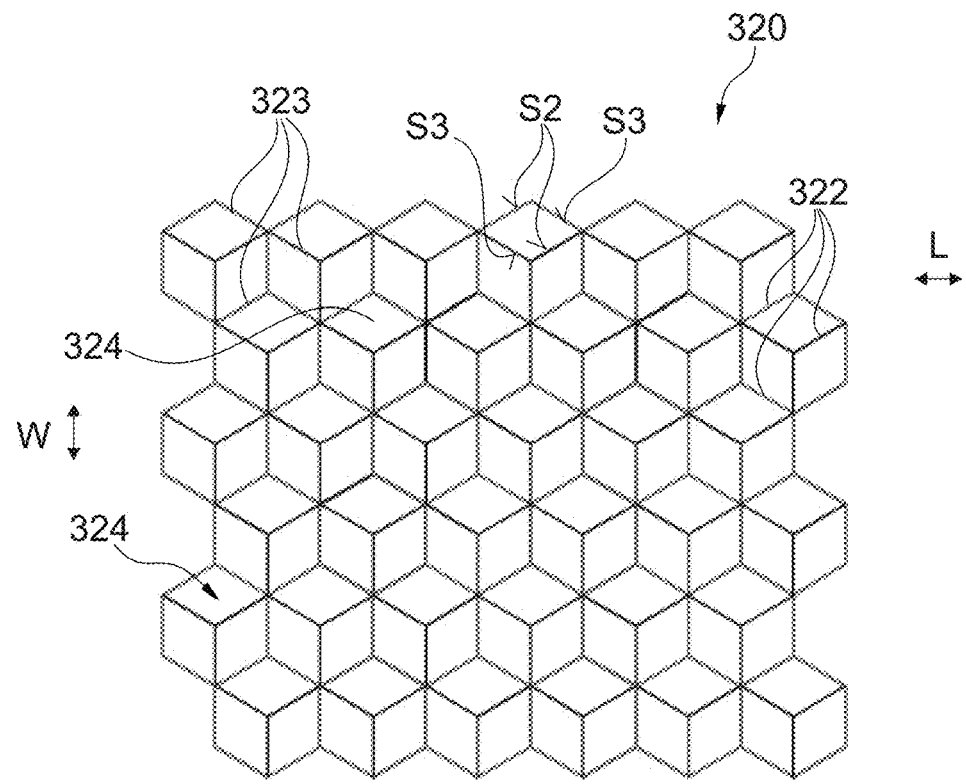
FIG. 3A shows a diagrammatic plan view of a variant of the second embodiment.
Figure 3B:
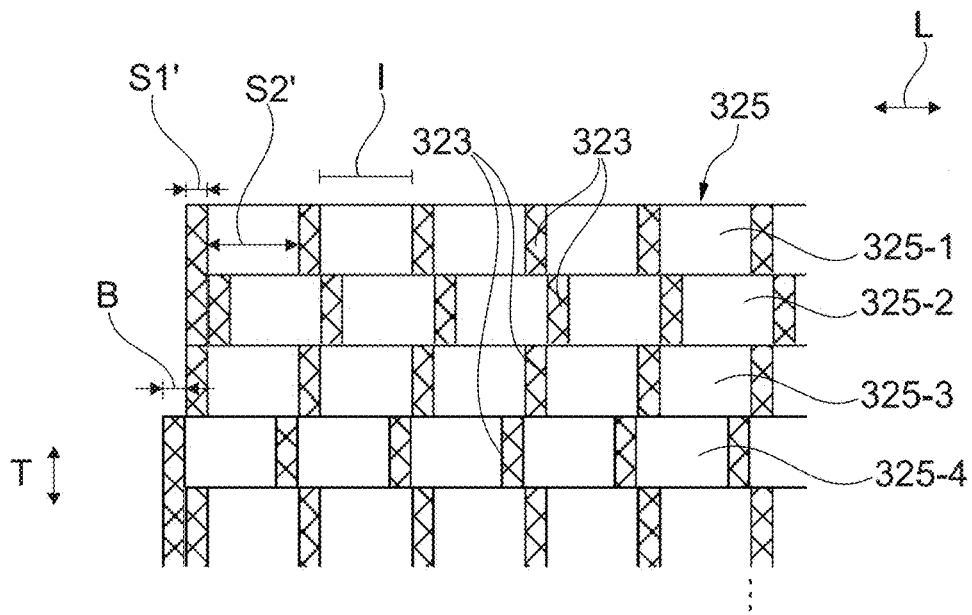
FIG. 3B shows a diagrammatically illustrated deposit stacking procedure for a honeycomb as shown in FIG. 3A.
Figure 8:
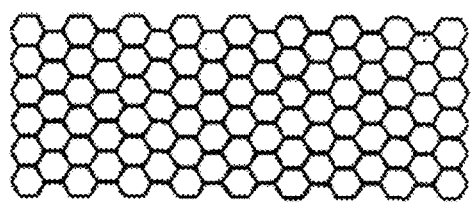
FIGS. 8(A)-(F) show honeycomb geometries which are previously known from the state of the art: hexagonal honeycomb (A); reinforced hexagonal honeycomb (B); overexpanded hexagonal honeycomb (C); square honeycomb (D); underexpanded hexagonal honeycomb (E); and so-called FLEX-CORE honeycomb (F).
Figure 8:
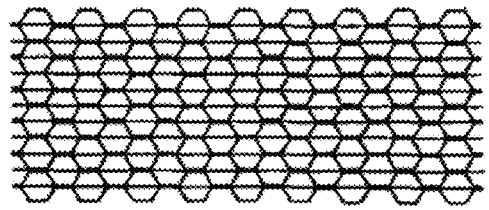
Figure 8:
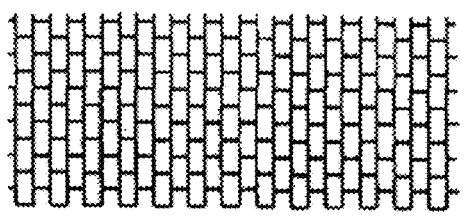
Figure 8:
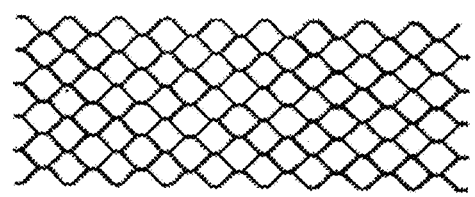
Figure 8:
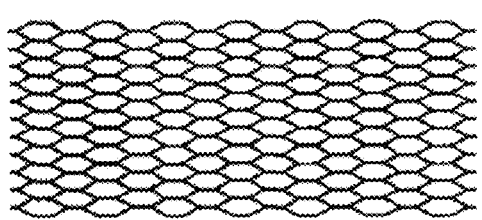
Figure 8:
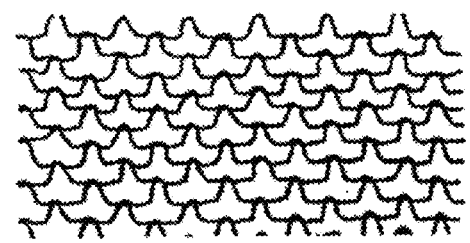

FIGS. 3A-3B show a modification or a special case of the embodiment of FIGS. 2A-2B with also alternately intermittent and direction-alternating displacement S1' and S2' respectively. The characteristic form of that honeycomb 320 as shown in FIGS. 3A-3B is achieved by the length of the shorter limbs S1 being vanishingly small or being technically reduced to zero, as shown in FIG. 3B. That is achieved if for example in the stacking procedure (FIG. 3B) or in the welding process the lesser displacement S1' corresponds except for inevitable tolerance precisely to the width B of the connecting regions 323, for example adhesive strips or weld seams. Consequently the greater displacement S2' precisely corresponds to the regular center spacing or interval I of the connecting regions 323. Upon complete expansion, in particular in the case of metal films, like for example aluminum film, as the material for the ribbons 322, the honeycombs 324 are of a substantially consistently identical quadrangular shape in the L/W plane. Three mutually adjoining honeycombs 324 in this case respectively form regular hexagons, as shown in FIG. 3A (in a group of three with three basic shapes respectively rotated about the T-axis through 120°). Unlike the situation in FIGS. 1A-2A, in FIG. 3A the predominant proportion of or all honeycombs 324 in cross-section in the L/W plane are in a shape in the manner of a polygon, here for example a regular quadrangle or a rhombus (when S2'-B=B) or a parallelogram (when S2'-B≠B). The basic shape which is substantially identical within the honeycomb 320 however, unlike the case with the state of the art (FIG. 8), is arranged predominantly, and in FIG. 3A in respect of a proportion of ⅔, non-symmetrically relative to the T/W plane. The embodiment of FIGS. 3A-3B exhibits good strength values.

Figure 4A:
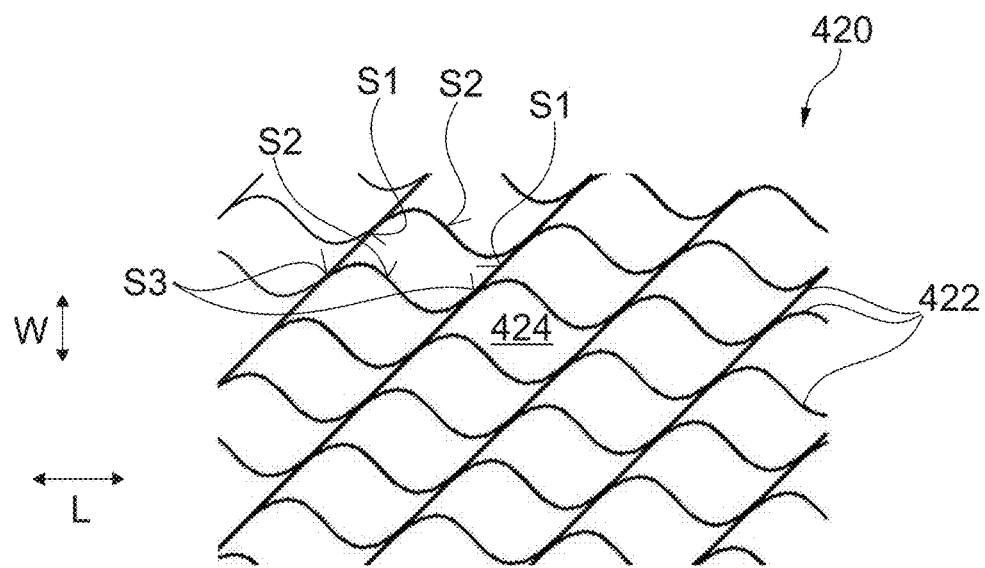
FIG. 4A shows a diagrammatic plan view of a honeycomb according to the invention of a third embodiment.
Figure 4B:
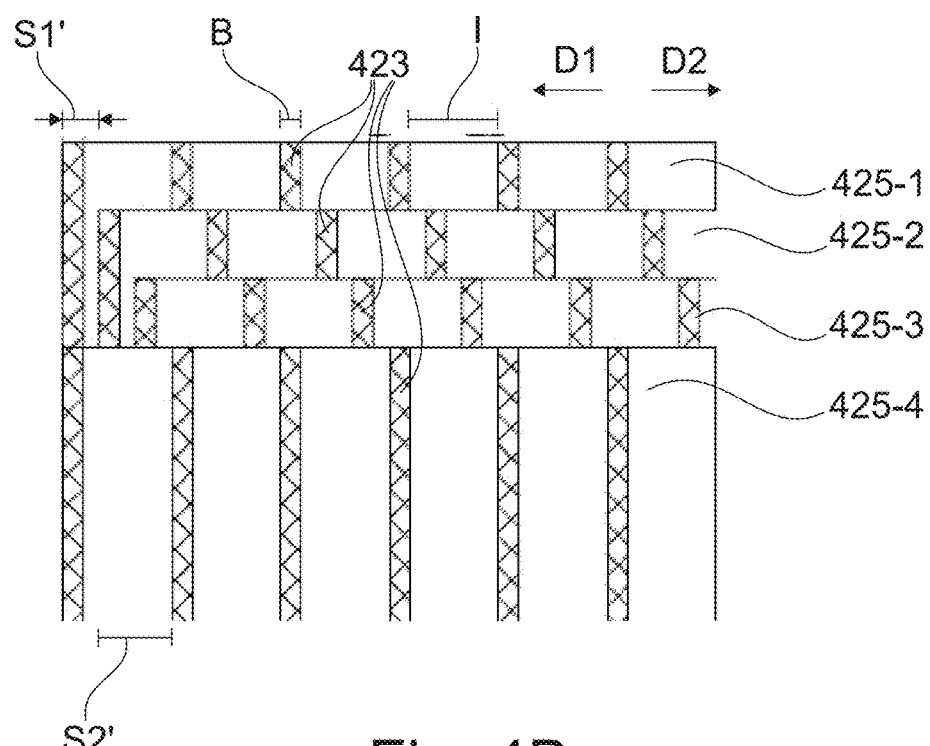
FIG. 4B shows a diagrammatically illustrated deposit stacking procedure for a honeycomb as shown in FIG. 4A, FIG. 5(a)-(h) show a diagrammatic implementation of the preferred production process for production of a honeycomb.

Finally FIGS. 4A-4B show a further modification of the invention. In the honeycomb 420 the ribbons 422 extend approximately in a wavy shape and slightly inclined relative to the L-direction, as shown in FIG. 4A. That is achieved with a stacking procedure as shown in FIG. 4B, in which connecting regions 423 which occur in succession in the W-direction are always displaced relative to each other and towards the same side, for example D2. In this case the lesser displacement S1' is preferably so selected that S1' is a divider of the center spacing I. As a result, after a succession of N=B/S1' sheets 425-1 ... 425-3, the next sheet 425-4 is again deposited parallel to the initial sheet in order to reduce the material expenditure and to facilitate the deposit process. A corresponding deposit process with B/S1'=3 is shown in FIG. 4B.

The wave-like basic shape for the honeycombs 424 in FIG. 4A, with in each case two short, approximately straight limbs S1, corresponding to the lesser displacement S1', two widely curved longer limbs S2, corresponding to the greater displacement S2', and approximately rectilinear third limbs S3, corresponding to the width B of the connecting regions 423, is arranged repetitively regularly and identically throughout.

The honeycomb 420 of the embodiment of FIGS. 4A-4B is deformable with relatively slight anticlastic characteristics appropriately for many uses and, with comparable dimensioning and choice of material, typically presents better compression and shearing strength values than for example the honeycomb of FIG. 1A.

Figure 5:
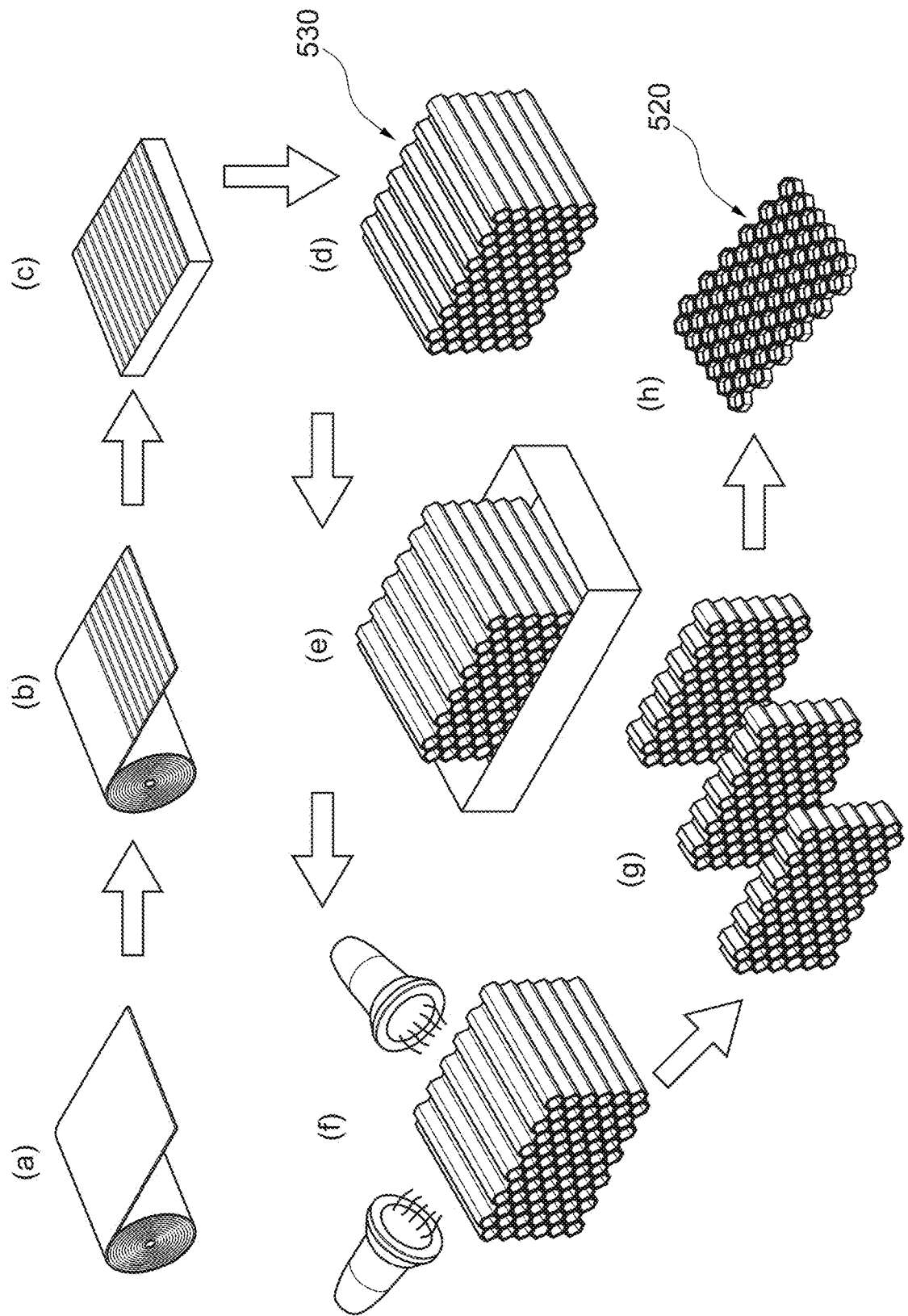
Figure 6:
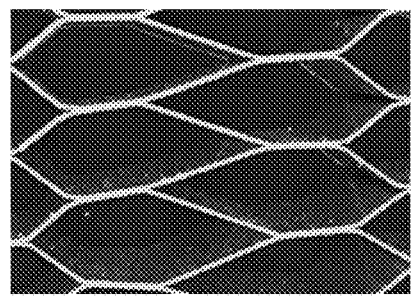
FIGS. 6(a)-(d) show photographic snapshots illustrating the production of a honeycomb according to the invention from aluminum foil during expansion in the W direction (see FIG. 5(d))
Figure 6:
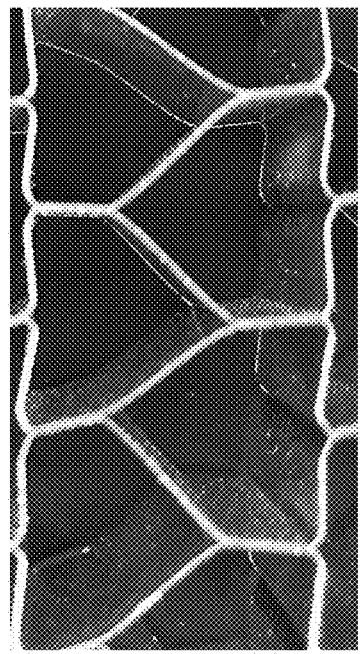
Figure 6:
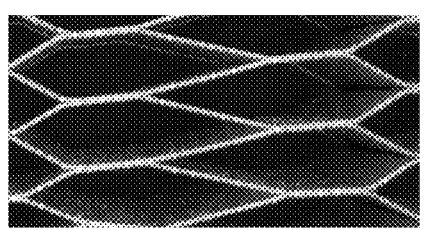
Figure 6:
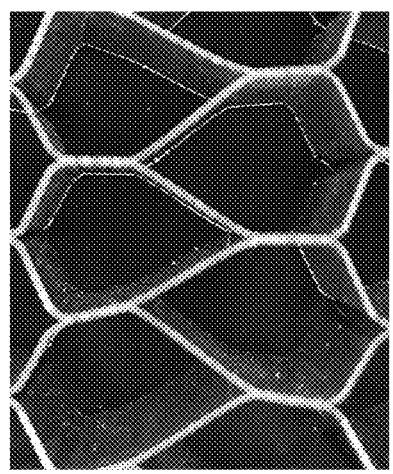

FIG. 5 shows the various stages in the preferred method of expansion for honeycomb production. In step (a) a roll involving sheet-like or film-like material is provided, on to which in step (b) adhesive strips or adhesive lines which are parallel at regular or periodic spacings are printed in perpendicular relationship over the entire width. In step (c) sheets of identical format are cut to size from the roll, deposited one upon the other in predetermined fashion and then the stack of sheets, which is deposited in accordance with the desired stacking process, is processed by pre-hardening or final hardening of the adhesive strips, for example under the effect of pressure and/or temperature in a press, to give a coherent block. Instead of using adhesive in steps (b) and (c), it is possible, depending on the respective material, for the connecting regions to be produced for example by welding in accordance with a suitable procedure. In step (d), expansion is effected in the W-direction in per se known manner in such a way as to result in a honeycomb block 530 with honeycomb cells (FIG. 5 shows the known hexagonal shape). The expanded block is then stabilized, for example by the action of temperature in a furnace. The block is then uniformly impregnated with synthetic resin in the (optional) step (e). In the (optional) step (f) initial hardening or final hardening of the resin is effected by suitable means so that for example this results in an FCP. Then in step (g) the block which is stable in shape in respect of the honeycomb shape is cut up or separated into individual honeycomb slices in a cutting or sawing apparatus by separation in the L/W plane. The honeycomb 520 of the desired geometry is then provided in step (h).

Honeycomb geometries according to the invention can be implemented in a particularly simpler fashion in that, in step (c), after a suitable procedure, in relation to adhesive connections, for example a stacking process as shown in FIG. 1C, FIG. 2C, FIG. 3B or FIG. 4B or for example in accordance with a congruent pattern of weld seams, a predetermined eccentric displacement of the connecting regions is produced. Otherwise there is no need for complicated and expensive adaptations in respect of the tried-and-tested expansion method.

FIGS. 6(a)-(d) show different expansion steps during expansion of the honeycomb in the W-direction. In this case the limbs of differing length of the honeycomb geometry of a cell and the development of the honeycomb geometry towards a geometry shown in FIG. 1(a) is illustrated by means of the photograph of a prototype.

Figure 7:
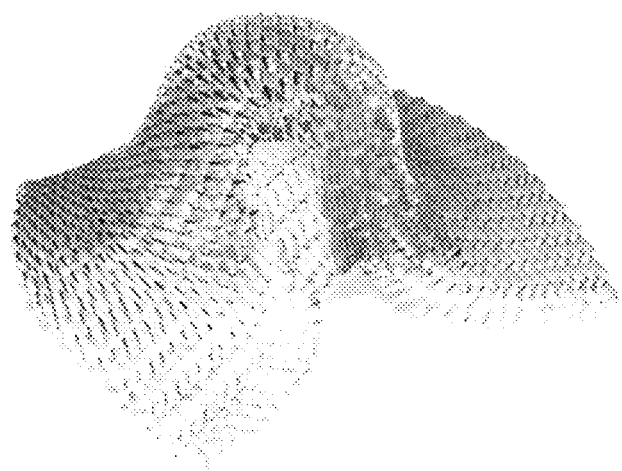
FIG. 7 shows a photograph of a honeycomb according to the invention comprising aluminum foil with a geometry as shown in FIG. 1, purely by way of example, deformed in three dimensions, here approximately spherically.

FIG. 7 shows purely by way of example and without limitation on the invention a possible configuration with honeycomb of metal film, for example aluminum film, which at the outside or in the basic state is of the geometry shown in FIG. 1(a).

LIST OF REFERENCES

FIGS. 1-4:
A expansion
B width of adhesive strip
I center spacing
L L-direction (longitudinal direction)
S1, S2, S3 limbs or honeycomb walls
S1' lesser displacement
S2' greater displacement
D1, D2 first and second side direction
T T-direction (honeycomb thickness or gauge)
W W-direction (transverse direction)
  FIGS. 1A-1C:
120 deformable honeycomb
122 ribbon
122-1, 122-2, 122-3 sequence of ribbons
123 adhesive strip
124 honeycomb cell
125 sheet
125-1, 125-2, 125-3 sequence of sheets
  FIGS. 2A-2C:
220 deformable honeycomb
222 ribbon
222-1 . . . 222-4 sequence of ribbons
223 adhesive strip
224 honeycomb cell
224A, 224B basic shapes
225 sheet
225-1 . . . 225-4 sequence of sheets
  FIGS. 3A-3B:
320 honeycomb
322 ribbon
323 weld seams/adhesive strips
324 honeycomb cell
325 sheet
325-1 . . . 325-4 sequence of sheets
  FIGS. 4A-4B:
420 honeycomb
422 ribbon
422-1 . . . 422-4 sequence of ribbons
423 adhesive strip
424 honeycomb cell
425 sheet
425-1 . . . 425-4 sequence of sheets
  FIG. 5:
(a) through (h): process portions
520 honeycomb
530 honeycomb block
  FIG. 6
(a) through (d): snapshots of various expansion steps
  FIG. 7: spatial geometry by way of example of a honeycomb (photograph)
  FIG. 8:
(A) through (F): previously known honeycomb geometries

The invention claimed is:

1. A deformable honeycomb for lightweight components, the honeycomb comprising:
   a plurality of elongate ribbons made from sheet-like or film-like material, the ribbons having a longitudinal direction and being arranged in an areal mutually opposite relationship in a transverse direction, transverse to the longitudinal direction,
   a plurality of connecting regions, each being provided between two mutually opposite ribbons, connecting the ribbons together in a portion-wise manner in a firmly bonded relationship in the transverse direction and having a width along the longitudinal direction, the connecting regions between a respective two mutually opposite ribbons being arranged at regular spacings along the longitudinal direction, and
   honeycomb-cells forming cavities between the ribbons,
   wherein, the plurality of ribbons includes a set of first, second and third successive ribbons arranged in the transverse direction, the second ribbon comprising:
      a first portion overlapping a connecting region of the plurality of connecting regions that is between the first and second ribbons,
      a second portion free from overlapping connecting regions,
      a third portion overlapping a connecting region of the plurality of connecting regions that is between the second and third ribbons, and
      a fourth portion also free from overlapping connecting regions, wherein the first, second, third and fourth portions of the second ribbon are arranged successively along the longitudinal direction and the second and fourth portions define differing lengths along the longitudinal direction; and
   at least a part of the honeycomb-cells in cross-section in a longitudinal direction/transverse direction plane have at least one longer limb corresponding to whichever of the second portion and the fourth portion defines a greater length, and at least one shorter limb, in comparison with the at least one longer limb,
   wherein the ribbons are made of a fiber composite plastic, an aluminium film, a copper film, a steel film, a plastic film or a multi-layer laminate material comprising at least one of a metal film and a plastic film, and
   wherein a shorter portion of the second portion and the fourth portion, in addition to the width of an adjacent connecting region preceding the shorter portion, defines a first sum, and a longer portion of the second portion and the fourth portion, in addition to the width of an adjacent connecting region preceding the longer portion, defines a second sum, and a ratio of the first sum relative to the second sum is ≤0.45.

2. The honeycomb of claim 1, wherein at least a part of the cells in cross-section in the longitudinal direction/transverse direction (L/W) plane further have at least one shorter limb corresponding to whichever of the second portion and the fourth portion defines a shorter length.

3. The honeycomb of claim 2, wherein at least a majority of the honeycomb-like cells have a substantially identical shape in cross-section in the L/W plane, with the at least one longer limb and the at least one shorter limb.

4. The honeycomb of claim 1, wherein the honeycomb is deformable in three dimensions with reduced anticlastic properties in comparison with conventional honeycomb geometries.

5. The honeycomb of claim 1, wherein successive connecting regions in the transverse direction are asymmetrically displaced relative to each other.

6. The honeycomb of claim 1, wherein at least a majority of the honeycomb-like cells are in the form of an irregular polygon in cross-section in the longitudinal direction/transverse direction plane.

7. The honeycomb of claim 6, wherein the cross-section is substantially cup-shaped and has six limbs in the form of an irregular hexagon.

8. The honeycomb of claim 7, wherein spacing of successive connecting regions in the transverse direction is less than whichever of the second portion and the fourth portion has a shorter length in the longitudinal direction.

9. The honeycomb of claim 1, wherein the connecting regions extend strip-like perpendicularly to the longitudinal direction in a direction of a honeycomb thickness and are of a width which is identical throughout in the longitudinal direction; and wherein the connecting regions are adhesively bonding the respective portions of adjacent ribbons.

10. The honeycomb of claim 9, wherein both the second portion and the fourth portion define greater lengths in the longitudinal direction than the width of the connecting regions in the longitudinal direction.

11. The honeycomb of claim 1, wherein the ribbons are made from aluminium film, and the longer limb extends in a straight line.

12. The honeycomb of claim 1, wherein a thickness of the honeycomb is less than six times the longer limb.

13. The honeycomb of claim 1, wherein a shorter portion of the second portion and the fourth portion, in addition to the width of an adjacent connecting region preceding the shorter portion, defines a greater dimension than a thickest material thickness used for the ribbons by at least two times.

14. A sandwich component including a core of honeycombs of claim 1, the honeycombs being closed on at least one side by a face sheet glued thereto, wherein the face sheet is made from a fiber composite material, a single-layer or multi-layer film material, or monolithically from metal.

15. The honeycomb of claim 1, wherein the plurality of connecting regions between a respective two mutually opposite ribbons are equally spaced apart.

16. A deformable honeycomb for lightweight components, the honeycomb comprising:
a plurality of elongate ribbons made from sheet-like or film-like material, the ribbons having a longitudinal direction and being arranged in an areal mutually opposite relationship in a transverse direction, transverse to the longitudinal direction,
a plurality of connecting regions, each being provided between two mutually opposite ribbons, connecting the ribbons together in a portion-wise manner in a firmly bonded relationship in the transverse direction, the connecting regions between a respective two mutually opposite ribbons being arranged at regular spacings along the longitudinal direction, and
honeycomb-cells forming cavities between the ribbons,
wherein, the plurality of ribbons includes a set of first, second and third successive ribbons arranged in the transverse direction, the second ribbon comprising:
a first portion overlapping a connecting region of the plurality of connecting regions that is between the first and second ribbons,
a second portion free from overlapping connecting regions,
a third portion overlapping a connecting region of the plurality of connecting regions that is between the second and third ribbons, and
a fourth portion also free from overlapping connecting regions, wherein the first, second, third and fourth portions of the second ribbon are arranged successively along the longitudinal direction and the second and fourth portions define differing lengths along the longitudinal direction; and
at least a part of the honeycomb-cells in cross-section in a longitudinal direction/transverse direction plane have at least one longer limb corresponding to whichever of the second portion and the fourth portion defines a greater length, and at least one shorter limb, in comparison with the at least one longer limb,
wherein the connecting regions extend strip-like perpendicularly to the longitudinal direction in a direction of a honeycomb thickness and are of a width which is identical throughout in the longitudinal direction; and wherein the connecting regions are adhesively bonding the respective portions of adjacent ribbons, and
wherein a shorter portion of the second portion and the fourth portion, in addition to the width of one connecting region, defines a first sum, and a longer portion of the second portion and the fourth portion, in addition to the width of one connecting region, defines a second sum, and at least one of (i) a ratio of the second sum relative to the width of one connecting region along the longitudinal direction is within the range of 2 and 4, and (ii) a ratio of the first sum relative to the width of one connecting region in the longitudinal direction is within the range of 1.5 and 2.5.

17. A deformable honeycomb for lightweight components, the honeycomb comprising:
a plurality of elongate ribbons made from sheet-like or film-like material, the ribbons having a longitudinal direction and being arranged in an areal mutually opposite relationship in a transverse direction, transverse to the longitudinal direction,
a plurality of connecting regions, each being provided between two mutually opposite ribbons, connecting the ribbons together in a portion-wise manner in a firmly bonded relationship in the transverse direction, the connecting regions between a respective two mutually opposite ribbons being arranged at regular spacings along the longitudinal direction, and
honeycomb-cells forming cavities between the ribbons,
wherein, the plurality of ribbons includes a set of first, second and third successive ribbons arranged in the transverse direction, the second ribbon comprising:

a first portion overlapping a connecting region of the plurality of connecting regions that is between the first and second ribbons,
a second portion free from overlapping connecting regions,
a third portion overlapping a connecting region of the plurality of connecting regions that is between the second and third ribbons, and
a fourth portion also free from overlapping connecting regions, wherein the first, second, third and fourth portions of the second ribbon are arranged successively along the longitudinal direction and the second and fourth portions define differing lengths along the longitudinal direction; and
at least a part of the honeycomb-cells in cross-section in a longitudinal direction/transverse direction plane have at least one longer limb corresponding to whichever of the second portion and the fourth portion defines a greater length, and at least one shorter limb, in comparison with the at least one longer limb,
wherein the ribbons are made of:
a fiber composite plastic,
an aluminium film,
a copper film,
a steel film,
a plastic film, comprising a plastic material, a thermoplastic material, a thermosetting material or a combination thereof, or
a multi-layer laminate material comprising at least one of a metal film and a plastic film; and
wherein the longer limb extends in a curved configuration.

18. A honeycomb block for the production of a deformable honeycomb for lightweight components having a curved surface, the honeycomb block comprising:
a plurality of sheets made from sheet-like or film-like material, the sheets having a longitudinal direction and being arranged in an areal mutually opposite relationship in a transverse direction, transverse to the longitudinal direction;
a plurality of connecting regions, each being provided between two mutually opposite sheets, connecting the sheets together in a portion-wise manner in a firmly bonded relationship in the transverse direction, the connecting regions between a respective two mutually opposite sheets being arranged at regular spacings along the longitudinal direction, and
wherein, the plurality of sheets includes a set of first, second and third successive sheets arranged in the transverse direction, the second sheet comprising:
a first portion overlapping a connecting region of the plurality of connecting regions that is between the first and second sheets,
a second portion free from overlapping connecting regions,
a third portion overlapping a connecting region of the plurality of connecting regions that is between the second and third sheets, and
a fourth portion also free from overlapping connecting regions, wherein the first, second, third and fourth portions of the second sheet are arranged successively along the longitudinal direction and the second and fourth portions define differing lengths along the longitudinal direction;
wherein a shorter portion of the second portion and the fourth portion, in addition to the width of an adjacent connecting region preceding the shorter portion, defines a first sum, and a longer portion of the second portion and the fourth portion, in addition to the width of an adjacent connecting region preceding the longer portion, defines a second sum, and a ratio of the first sum relative to the second sum is ≤0.45; and
wherein the sheets are made of a fiber composite plastic, an aluminium film, a copper film, a steel film, a plastic film or a multi-layer laminate material comprising at least one of a metal film and a plastic film;
the honeycomb block being configured such that, after an expansion of the honeycomb block, at least a part of the cells in cross-section in a longitudinal/transverse direction plane have at least one longer limb corresponding to whichever of the second portion and the fourth portion defines a greater length and at least one shorter limb, in comparison with the at least one longer limb.

19. The honeycomb block of claim 18, wherein the plurality of connecting regions between a respective two mutually opposite sheets are equally spaced apart.

20. A honeycomb block for the production of a deformable honeycomb for lightweight components having a curved surface, the honeycomb block comprising:
a plurality of sheets made from sheet-like or film-like material, the sheets having a longitudinal direction and being arranged in an areal mutually opposite relationship in a transverse direction, transverse to the longitudinal direction;
a plurality of connecting regions, each being provided between two mutually opposite sheets, connecting the sheets together in a portion-wise manner in a firmly bonded relationship in the transverse direction, the connecting regions between a respective two mutually opposite sheets being arranged at regular spacings along the longitudinal direction, and
wherein, the plurality of sheets includes a set of first, second and third successive sheets arranged in the transverse direction, the second sheet comprising:
a first portion overlapping a connecting region of the plurality of connecting regions that is between the first and second sheets,
a second portion free from overlapping connecting regions,
a third portion overlapping a connecting region of the plurality of connecting regions that is between the second and third sheets, and
a fourth portion also free from overlapping connecting regions, wherein the first, second, third and fourth portions of the second sheet are arranged successively along the longitudinal direction and the second and fourth portions define differing lengths along the longitudinal direction;
wherein the connecting regions extend strip-like perpendicularly to the longitudinal direction in a direction of a honeycomb thickness and are of a width which is identical throughout in the longitudinal direction; and wherein the connecting regions are adhesively bonding the respective portions of adjacent ribbons, and
wherein a shorter portion of the second portion and the fourth portion, in addition to the width of one connecting region, defines a first sum, and a longer portion of the second portion and the fourth portion, in addition to the width of one connecting region, defines a second sum, and at least one of (i) a ratio of the second sum relative to the width of one connecting region along the longitudinal direction is within the range of 2 and 4, and (ii) a ratio of the first sum relative to the width of one connecting region in the longitudinal direction is within the range of 1.5 and 2.5 the honeycomb block being configured such that, after an expansion of the honeycomb block, at least a part of the cells in cross-section in a longitudinal/transverse direction plane have at least one longer limb corresponding to whichever of the second portion and the fourth portion defines a greater length and at least one shorter limb, in comparison with the at least one longer limb.

21. A honeycomb block for the production of a deformable honeycomb for lightweight components having a curved surface, the honeycomb block comprising:

a plurality of sheets made from sheet-like or film-like material, the sheets having a longitudinal direction and being arranged in an areal mutually opposite relationship in a transverse direction, transverse to the longitudinal direction;

a plurality of connecting regions, each being provided between two mutually opposite sheets, connecting the sheets together in a portion-wise manner in a firmly bonded relationship in the transverse direction, the connecting regions between a respective two mutually opposite sheets being arranged at regular spacings along the longitudinal direction, and wherein, the plurality of sheets includes a set of first, second and third successive sheets arranged in the transverse direction, the second sheet comprising:

a first portion overlapping a connecting region of the plurality of connecting regions that is between the first and second sheets, a second portion free from overlapping connecting regions, a third portion overlapping a connecting region of the plurality of connecting regions that is between the second and third sheets, and a fourth portion also free from overlapping connecting regions, wherein the first, second, third and fourth portions of the second sheet are arranged successively along the longitudinal direction and the second and fourth portions define differing lengths along the longitudinal direction; and wherein the sheets are made of:
a fiber composite plastic,
an aluminium film,
a copper film,
a steel film,
a plastic film, comprising a plastic material, a thermoplastic material, a thermosetting material or a combination thereof, or
a multi-layer laminate material comprising at least one of a metal film and a plastic film;

the honeycomb block being configured such that, after an expansion of the honeycomb block, at least a part of the cells in cross-section in a longitudinal/transverse direction plane have at least one longer limb corresponding to whichever of the second portion and the fourth portion defines a greater length and at least one shorter limb, in comparison with the at least one longer limb, wherein the longer limb extends in a curved configuration.

* * * * *